No. 618,930. Patented Feb. 7, 1899.
E. B. BARKER.
ROLL HOLDING CAMERA.
(Application filed May 29, 1897.)

(No Model.)

Witnesses
Edward C. Rowland.
A. B. Morrison.

Erastus B. Barker
Inventor
By his Attorney
Phillips Abbott.

THE NORRIS PETERS CO., PHOTO-LITHO., WASHINGTON, D. C.

ate the threading of the film about the

UNITED STATES PATENT OFFICE.

ERASTUS B. BARKER, OF NEWARK, NEW JERSEY, ASSIGNOR TO THE E. & H. T. ANTHONY & COMPANY, OF NEW YORK, N. Y.

ROLL-HOLDING CAMERA.

SPECIFICATION forming part of Letters Patent No. 618,930, dated February 7, 1899.

Application filed May 29, 1897. Serial No. 638,822. (No model.)

*To all whom it may concern:*

Be it known that I, ERASTUS B. BARKER, a citizen of the United States, and a resident of Newark, in the county of Essex and State of New Jersey, have invented certain new and useful Improvements in Film-Carrying Cameras, of which the following is a specification.

The invention relates to improvements in roll-holding cameras; and it consists in the peculiar construction and arrangement of the parts whereby the camera is rendered more convenient in use, particularly when threading or springing the film through it, also the size and weight of certain of the parts as heretofore constructed are reduced, and especially-constructed indicating devices are used which avoid the necessity for marking the film. Means are also provided whereby the operator can determine when the black paper, which in these days is usually attached to one and sometimes both ends of the sensitized film, has passed the field of the camera and the sensitized film brought into position.

The invention is more especially intended for use in conjunction with a camera made in the forms now known as the "Hawk Eye" and the "Bull's Eye"—in other words, those in which the delivery and take-up spools for the film are located at the front portion of the camera in chambers or spaces located at the side of the lens, the film proceeding from the delivery-spool or the "spool," as it is ordinarily called, rearwardly around the roller located at one of the rear corners of the camera, thence across the rear end of the camera, which or a part of which constitutes the field, thence around a roller at the opposite corner, and thence forwardly again to the winding "spool" or "reel," as it is ordinarily called.

Figure 1:
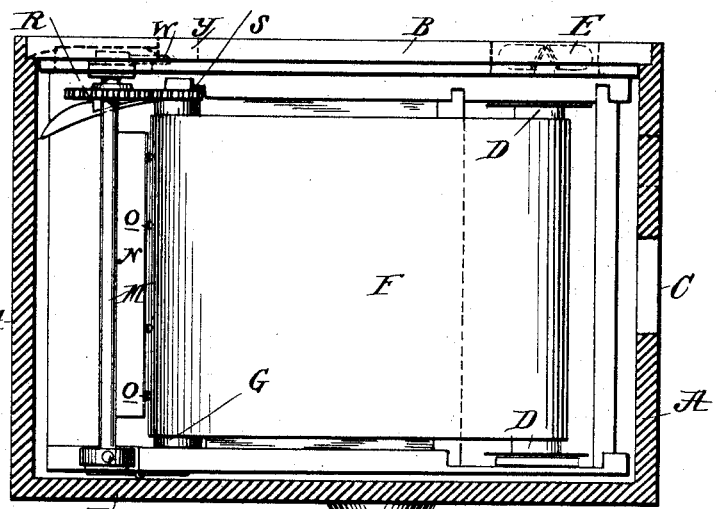
Figure 2:
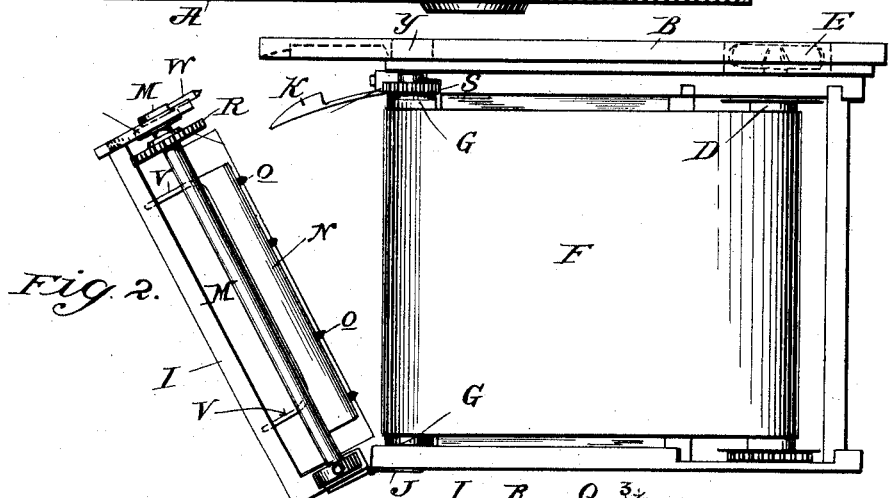
Figure 3:
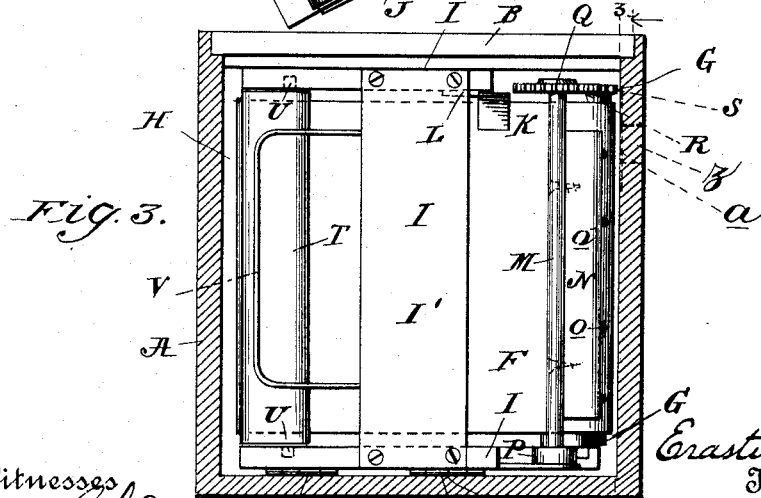

Figure 1 illustrates a side elevation of the camera, showing the operative parts inclosed within the exterior case of the camera. Fig. 2 illustrates the interior or operative parts in elevation, the same as shown in Fig. 1, with the frame which carries the marking and the friction devices swung downwardly to facilitate the threading of the film about the camera. Fig. 3 illustrates a rear view of the parts more immediately involved in the invention.

A is the exterior case or box proper of the camera. It is an integral structure, except one side thereof, B, which is removable, being attached to the remaining parts of the case by clips of any suitable construction. To the removable part B the operative mechanism is attached.

C is the opening in the front of the camera, in rear of which the lens is located.

D is the take-up spool or reel. E is the thumb-nut for turning it.

F is the film.

G is one of the guide-rollers. H (see Fig. 3) is the other guide-roller at the opposite corner.

I is a frame, which may be made of wood or any other suitable material, which is hinged, as at J J, to the bottom of the camera-box proper and is adapted to be swung upwardly, as shown in Fig. 2, and is caught upon a spring-latch K, which engages with a suitable striker-plate or other part L on the swinging frame. This swinging frame carries the marking devices, consisting of a shaft M, which carries a radially-extending plate N, provided with prick-points O. The shaft is journaled at one end in a bearing P and at the other in a metal plate Q, which is attached to the swinging frame I and has rigidly fastened to it a gear R, which meshes into a pinion S, mounted on one end of the guide-roller G. The frame I likewise carries the friction or tension generating device or pressure-pad T, which is eccentrically pivoted, as at U U, and provided with a compression-spring V, which is attached to a cross-bar I' of the frame I and maintains a permanent pressure upon the pad T, pressing it downwardly against the roller H, as shown in Fig. 3. Upon the end of the shaft M which carries the marking devices N a radially-arranged pointer or finger W (see particularly Fig. 2) is arranged, which when the swinging frame is in its closed position and the gear R intermeshed with the pinion S is so located that during the revolution of the shaft M it will come into view through the peep-hole Y, made in the side of the removable plate B, and this peephole may be covered with glass, celluloid, or other protecting means, which may be treated with non-actinic coloring-matter or left plain, as preferred. If the latter, means must be supplied, such as now well understood, to protect the film against being light struck.

In the side of the exterior casing, as indicated at Z, (see Fig. 3,) is another peep-hole, which should be protected by a celluloid or glass plate $a$, through which the black paper and the film can be observed as they pass around the guide-rollers at the rear corners of the camera.

The operation is as follows: In order to load the camera with film, the frame I, carrying the parts attached to it, is unlatched and swung backwardly into a position substantially at right angles to its normal or operative position. The spool of film is then dropped into one of the recesses and secured therein, as usual. The end of the film is quickly and easily reeled off, passed around the rear guide-rollers, and made fast to the take-up reel on the opposite side. Then the frame I is swung back again into place, which latches in a moment, and the camera is loaded. Thus all the annoyance and care necessitated by the threading of the film through the roll-holder as now ordinarily constructed are avoided. As the film is advanced consequent upon the taking of pictures successively its engagement with the roller G rotates it, and the pinion S upon that roller meshing into the gear R on the shaft M rotates that shaft, carrying the marking device N and the pointer W with it, and the relative sizes of the parts are such that at each complete revolution of the shaft M enough of the film has been reeled off to constitute a separate exposure or picture, and the radial plate N in its revolution comes in contact with the film adjacent to the roller G, and the prick-points O thereon puncture the film, thus showing the proper place for subsequent transverse cutting, and likewise as the pointer W passes into registration with the peep-hole Y the amount of film which has been reeled off can be determined by the operator. It will of course be understood that the indicator W and the marking device N are properly registered one with the other.

The peep-hole Z in the side of the camera is a very useful device, because through it the passage of the black paper relative to the end of the sensitized film can be observed, and thus the operator be assured that he is not making an exposure uselessly and also that he is not wasting his film.

It will be obvious to those who are familiar with this art that various modifications may be made in the details of construction as above set forth without departing from the essentials of my invention. I therefore do not limit myself to such details.

I claim—

1. The combination, in a camera, of supply and take-up spools located at or near the front of the camera and supported by it, guiding devices for the film likewise supported by the camera at or near its focal plane, and a movable frame supporting a measuring device in rear of said guiding devices and in operative connection with one of them, for the purposes set forth.

2. The combination, in a camera, of supply and take-up spools located at or near the front of the camera and supported by it, guiding devices for the film likewise supported by the camera at or near its focal plane, a movable frame supporting a measuring device in rear of said guiding devices and in operative connection with one of them, and a friction device likewise supported by said movable frame, for the purposes set forth.

3. The combination in a roll-holding camera, of a supply-spool and a positively-driven take-up reel located at or near the front of the camera and supported by it, a guiding device for the film rotated by it, and a pivoted frame supporting a measuring device, actuated by said guiding device and adapted to be swung out of the way of the film during the loading of the camera, for the purposes set forth.

4. The combination in a roll-holding camera, of a guiding device for the film, a movable frame supporting a rotating measuring device, intermeshing gears upon said guiding device and said measuring device, an index-finger on the shaft of the measuring device which registers with a peep-hole in the case through which the finger may be observed, and a pressure device, for the purposes set forth.

Signed at New York, in the county of New York and State of New York, this 27th day of May, A. D. 1897.

ERASTUS B. BARKER.

Witnesses:
EDGAR L. TAYLOR,
E. B. HALLOCK.